United States Patent
Howell

[11] 3,841,662
[45] Oct. 15, 1974

[54] BOAT-TRAILER

[76] Inventor: James A. Howell, 3152 Ford Rd., Memphis, Tenn. 38109

[22] Filed: Sept. 21, 1973

[21] Appl. No.: 399,628

[52] U.S. Cl. .................................. 280/414 A, 9/1 T
[51] Int. Cl. ......................... B60p 3/10, B63c 13/00
[58] Field of Search .... 280/414 A, 34 A, 43, 87.05, 280/415 R, 43.17, 43.18, 43.19, 43.20; 115/1 A, 1 R; 9/1 T, 1 R

[56] References Cited
UNITED STATES PATENTS

| | | | |
|---|---|---|---|
| 2,501,750 | 3/1950 | Warner | 280/414 A |
| 2,736,568 | 2/1956 | Martin | 280/43.19 |
| 2,740,135 | 4/1956 | Church | 280/414 A X |
| 3,158,881 | 12/1964 | Clausen | 9/1 T |
| 3,608,111 | 9/1971 | Herden | 280/414 A |
| 3,618,149 | 11/1971 | Christensen | 9/1 T |
| 3,755,838 | 9/1973 | Dunagan | 9/1 T |

Primary Examiner—Leo Friaglia
Assistant Examiner—Randall A. Schrecengost
Attorney, Agent, or Firm—Alexander & Dowell

[57] ABSTRACT

The boat-trailer hull has a bow and has a rectangular opening extending across its bottom adjacent the stern of the hull. A built-in hitch projects beyond the bow and a yoke is horizontally pivoted on the hitch and carries a ground-engaging wheel whereby the yoke may be pivoted to bring the wheel from lowered ground-engaging position into raised inoperative position. A rectangular watertight well within the hull is disposed across the opening and also has a hinged cover. A U-shaped frame is horizontally pivoted along the lower end of the rear wall of the well whereby the legs of the frame may be swung from a position within the well to a position below the opening. An axle is journaled in the legs of the frame and rear ground wheels are carried by the ends of the axle. Articulated arms connect the lower end of the front wall of the well with the legs of the frame respectively; and sleeves slidable on the articulated arm are adapted to be positioned over adjacent articulations of the arms to maintain the rear ground wheels in lowered ground-engaging position, the sleeves when shifted to overlie only one of the articulations permitting the arms to foreshorten whereby the frame, wheels and articulated arms may be raised into housed position within the well.

10 Claims, 6 Drawing Figures

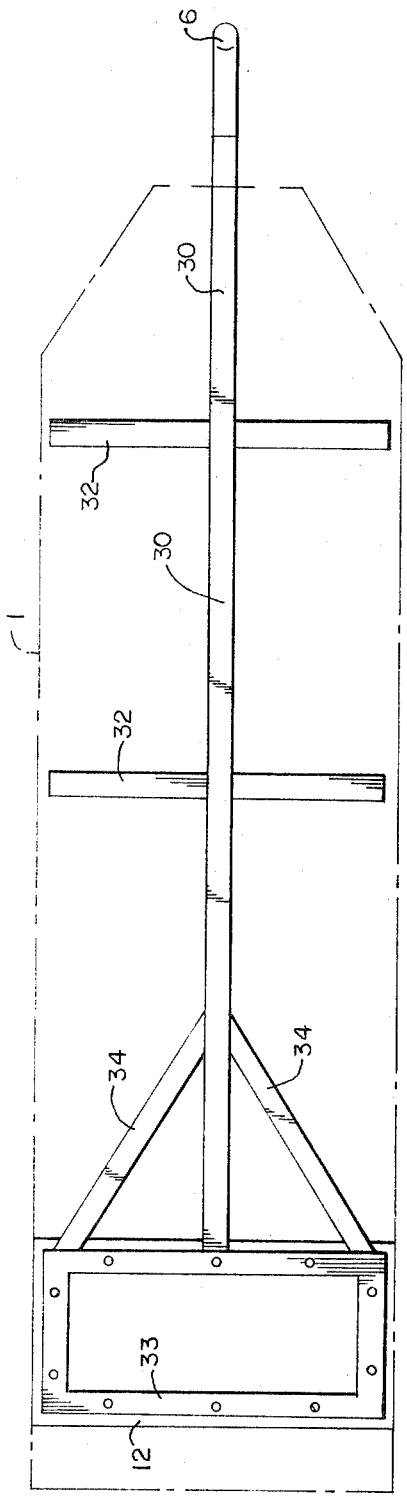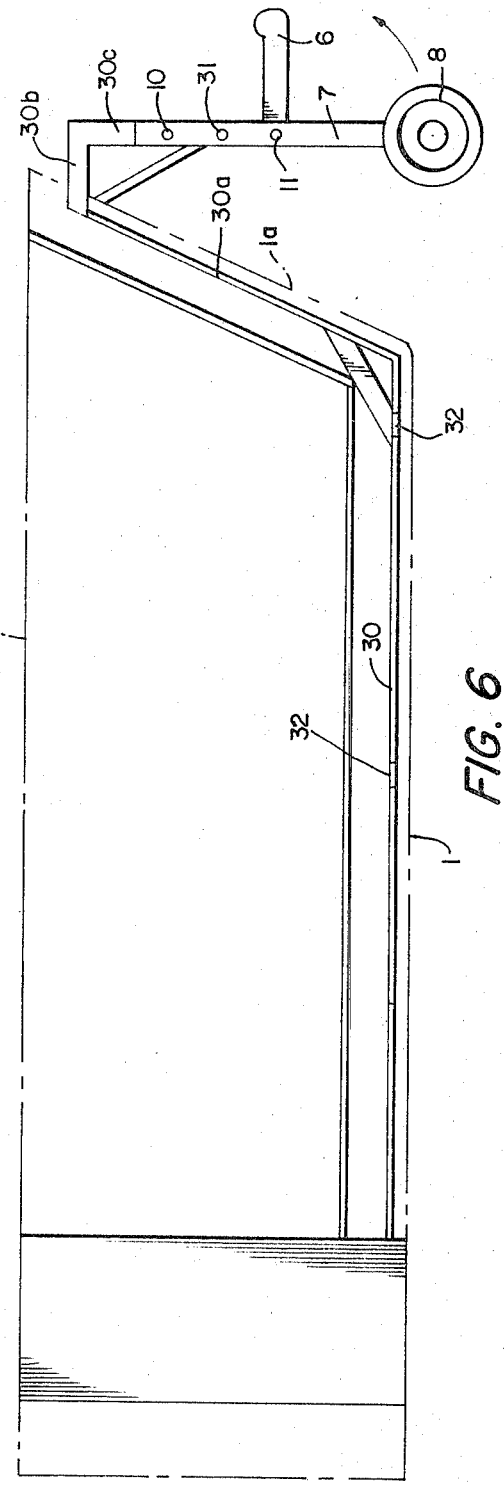

BOAT-TRAILER

DESCRIPTION OF INVENTION

This invention is a novel boat-trailer, and the principal object of the invention is to provide a boat, such as a fishing boat or the like, with built-in hitch at the bow end thereof with front ground wheels pivoted to the hitch whereby the front ground wheels may be swung from a lowered ground-engaging position into upper inoperative position when the boat is water bourne; also to provide built-in trailer rear wheels adjacent the stern of the boat which may be readily swung from a well within the boat hull into lowered ground-engaging position for transporting the boat along a road surface, or may be swung upwardly into housed position within the well above the bottom of the boat hull when the boat is floating on water.

By the above construction a man single-handed can get into the boat on the dock and ride it into the lake, raise the wheels and go fishing. Also, it is possible to leave the hitch wheel raised at the front of the boat if the dock has a steep incline and thus leave the motor running at low speed to hold the boat to the dock. In many cases it is easy to hitch the boat from the water.

Minor objects of the invention will be hereinafter set forth.

I will explain the invention with reference to the accompanying drawings which show several practical embodiments thereof to enable others familiar with the art to adopt and use the same; and will summarize in the claims the novel features of construction, and novel combinations of parts, for which protection is desired.

In said drawings:

FIG. 5 is a plan view of a combined tow bar and hitch used in connection with fibreglass boats, the tow bar being molded in the boat hull at the bottom thereof and interconnecting the well and the hitch, so that any stresses of towing the boat on land will be absorbed by the tow bar and not on the fibreglass of the hull, the outline of the bottom of the boat hull being in dot-and-dash lines.

FIG. 6 is a side elevation of the tow bar, hitch, and well shown in FIG. 5, and showing in dot-and-dash lines the outline of the side of the boat hull.

Figure 1:
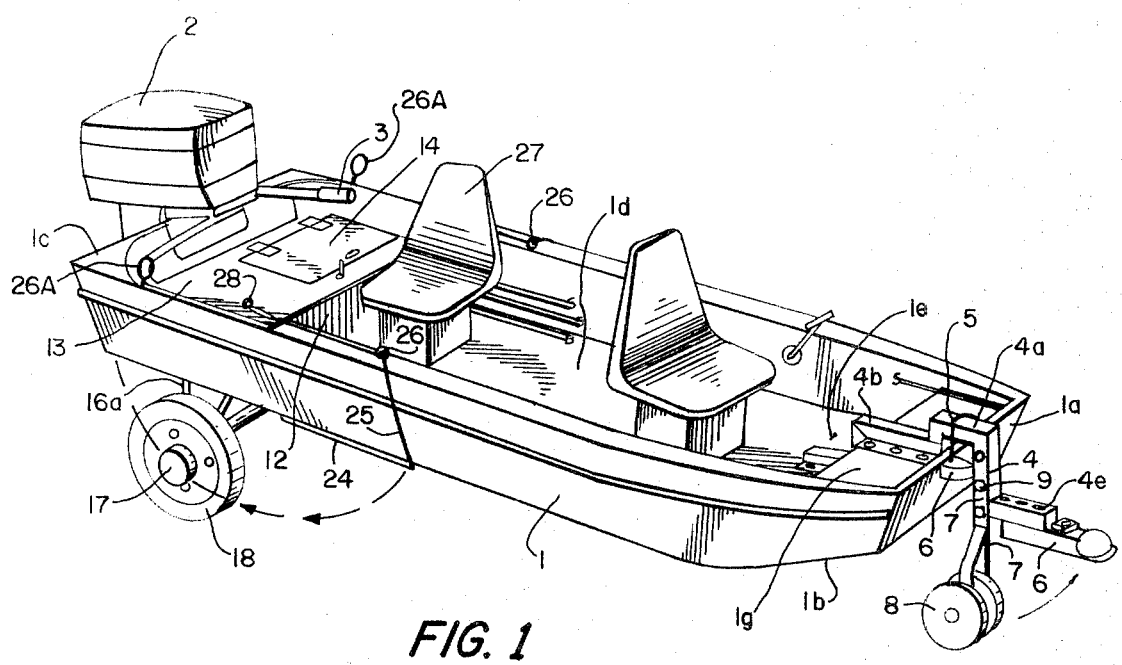
FIG. 1 is a perspective view of an aluminum boat showing the trailer wheels and hitch wheels lowered for ground engagement.
Figure 3:
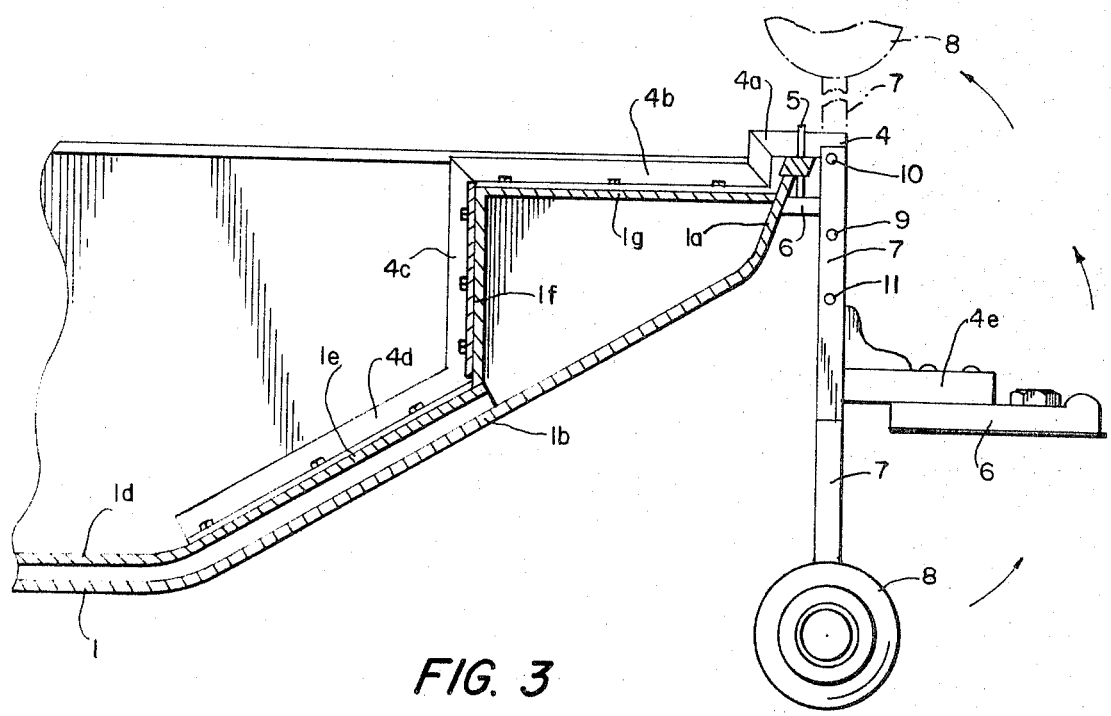
FIG. 3 is an enlarged longitudinal section through the bow of the boat shown in FIG. 1, showing the hitch mounted thereon, indicating in full lines the hitch wheels in lowered ground-engaging position, and in dot-and-dash lines the ground wheels raised into inoperative position.

In FIGS. 1 and 3, the boat hull is preferably formed of aluminum and comprises an outer aluminum hull shell 1 of usual form, the hull having a blunt bow 1a, and the bottom of the hull adjacent the bow sloping forwardly and upwardly as at 1b in the usual manner. The rear of the hull terminates in a transom 1c of usual form upon which is mounted an outboard motor 2 which may be steered by means of handle rod 3 for the purpose of guiding the boat. The hull 1 includes an inner wall 1d which may be coextensive with the bottom of the hull, the inner wall 1d sloping forwardly and upwardly as at 1e in way of the upwardly sloping portion 1b of the outer shell 1, whereby the inner wall 1d will be substantially parallel with but spaced from the outer shell 1.

The forward end of the inner wall 1d, as shown in FIG. 3, is directed substantially vertically upwardly as at 1f to a point adjacent the top of the outer hull 1 and then extended substantially horizontally as at 1g, to meet the outer hull 1a at the stem of the boat, as clearly shown in FIG. 3. If desired, the space between the hull 1 and inner wall 1d throughout the hull and adjacent to the bow 1a may be filled with flotation material in the customary manner to render the boat more buoyant.

At the bow 1a is a hitch consisting of a vertical bar 4 of desired strength disposed on the center line of the boat in advance of the bow 1a, the bar 4 having a flange 4a at its upper end which overlies the top of the bow 1a, as shown, and is clamped to the top of the bow 1a by means of a U-shaped strap 5 which straddles the flange 4a and has its ends secured in blocks 6, FIGS. 1 and 3, which are formed on the bow 1a of the hull.

From the inner end of the flange 4a the bar 4 is shaped as at 4b to conform with the top 1g of the inner wall 1d, and further extends downwardly as at 4c to conform with the vertical wall 1f of the inner wall 1d, and is further bent as at 4d to conform with the inclined wall 1e of the inner wall 1d, the same terminating at approximately the lower end of the inclined wall 1e, as clearly shown in FIG. 3, said hitch or tow bar portions 4b, 4c being secured to the inner wall of the boat by means of angle irons or the like which are welded or bolted to the inner wall and to the bar portions 4b, 4c and 4d, thereby securely anchoring the hitch or tow bar 4 to the bow of the boat.

As shown in FIGS. 1 and 3, the lower end of the hitch bar 4 in advance of the bow 1a is flanged outwardly as at 4e, and supports a hitch plate 6 secured thereto by bolts or the like, whereby the tow bar 4 may be secured or hitched to a towing vehicle for land transportation of the boat hull.

Associated with the tow bar 4 is a hitch wheel frame consisting of a yoke 7 in the bottom of which are pivotally mounted one or more ground wheels 8 in the usual manner. The upper portion of the yoke 7 is horizontally pivotally mounted on tow bar 4 by socket bolt 9 which transfixes the yoke and the underlying tow bar 4, as shown, whereby the yoke 7 may be swung from lowered position shown in FIGS. 1 and 3, to raised position shown in dot-and-dash lines in FIG. 3 when the hitch wheels are not to be used, as when the boat is waterborne.

In order to prevent swinging of the yoke 7 from its lowered position a bolt 10 is provided above the socket bolt 9, which transfixes the top of the yoke 7 and the underlying tow bar 4. But the bolt 10 may be removed when it is desired to raise the ground wheel 8 into raised position shown in dot-and-dash lines in FIG. 3, and the bolt 10 reinserted into registering perforations 11 in the yoke 7 and in the tow bar 4 below the socket bolt 9. When so inserted the hitch wheels 8 will be maintained in the raised position shown in dot-and-dash lines in FIG. 3.

Figure 2:
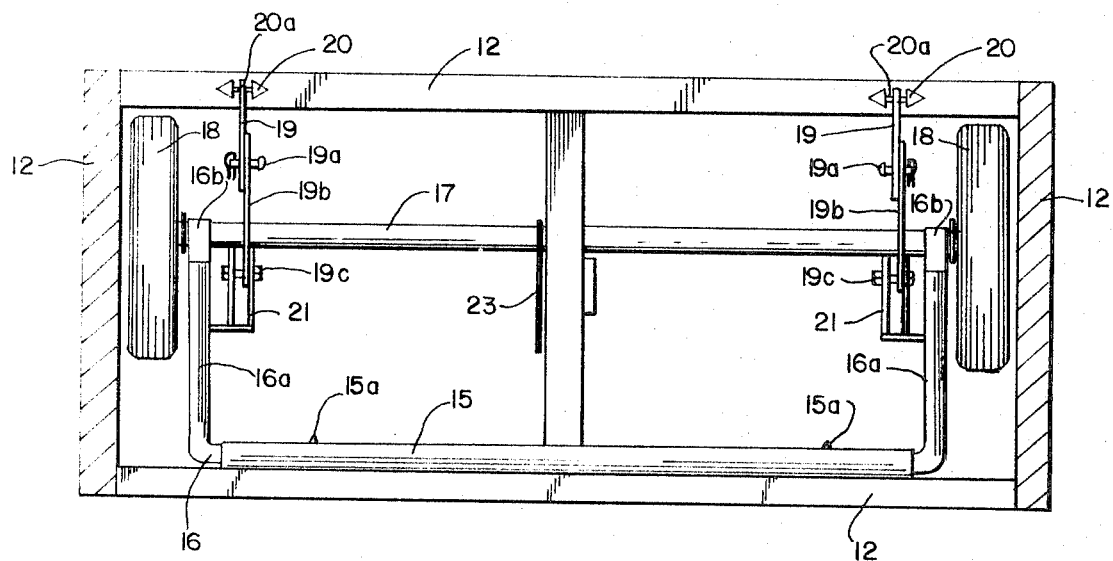
FIG. 2 is an enlarged top plan view of the well showing the rear trailer wheels housed therein, the bottom of the well communicating with the water beneath the boat.
Figure 4:
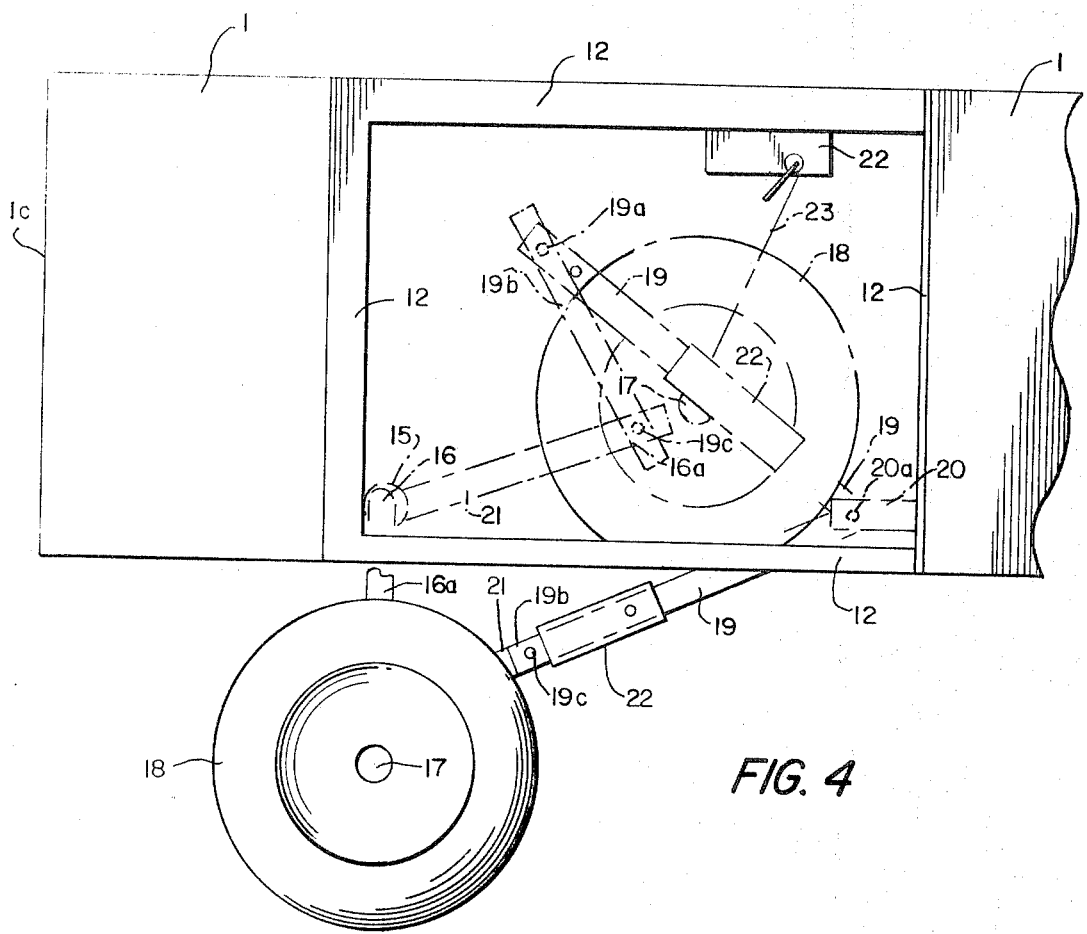
FIG. 4 is an enlarged side elevation of the stern of the boat opposite the well, showing the trailer rear wheels in ground-engaging position in full lines, and showing in dot-and-dash lines the ground wheels and supporting frame swung upwardly and housed within the well of the boat.

The aluminum boat construction shown in FIG. 1 is provided adjacent the stern with a well 12 shown more particularly in FIGS. 2 and 4, which well preferably comprises a watertight box extending between the sides of the hull adjacent the stern, as shown in FIG. 1, said well being coextensive with an opening in the bottom of the hull 1, the lower end of the well being open as shown in FIG. 2; also the top 12b, FIG. 2, being open, but the same being normally closed by a cover plate 13 having a hinged access cover 14, FIG. 1, therein, for the purpose hereinafter described.

The bottom of the well 12 is secured in a watertight manner around the opening in the hull, and when in use the well would contain water at sea-level without permitting leakage of water into the boat hull per se. The well 12 is adapted to contain and house the rear trailer wheels and frames when not in use, while permitting the wheels and frames to be lowered into ground-engaging position when desired, as clearly indicated in FIGS. 2 and 4.

As shown in FIG. 2, secured in any desired manner to the bottom of the rear wall of the well 12 across the lower edge thereof is a bearing tube 15 whose ends terminate short of the side walls of the well 12, said tube being provided with grease fittings 15a for lubrication purposes, the tube 15 being fixed in position above the rear edge of the opening for the well 12 in the hull bottom.

Within the tube 15 is journaled a U-shaped frame 16 having parallel leg portions 16a respectively beyond the ends of the tube 15 respectively, whereby as the frame 16 is rotated in the tube 15 the legs 16a thereof will extend downwardly through the open well below the boat hull, or may be swung upwardly to be housed within the well 12 of the boat.

Journaled in bearings 16b at the ends of the legs 16a is an axle 17 on which is rotatably mounted wheels 18 preferably equipped with pneumatic tires adapted when in lowered position shown in FIG. 4 to engage the ground or road surface for transportation of the boat by a towing vehicle.

As shown in FIG. 2, when the frame 16 is housed within the well 12 the wheels 18 will be disposed within the well 12 adjacent the side walls of the well. When the arms 16a are fully lowered, as shown in FIG. 4, the same will be maintained in such position by means of articulated arms 19 adjacent each wheel 18, which arms 19 are journaled as at 20a, FIGS. 2 and 4, on brackets 20 fixed to the lower portion of the front wall of the well 12. The outer ends of the articulated arms 19 are connected to the axle 17 of the wheels 18 as hereinafter described.

As shown in FIGS. 2 and 4, the articulated arm 19 is pivoted as at 19a to a link 19b whose outer end is pivoted as at 19c to a bracket 21 fixed to the outer end of the leg 16a of frame 16 adjacent axle 17, the articulated arm 19 being shown in extended position in full lines in FIG. 4, and in retracted position in dot-and-dash lines in FIG. 4. When the rear wheel frame is retracted into the well 12 the link 19b will assume a substantially vertical position in the well 12 thus foreshortening the length of the articulated arm 19 when housed within the well 12.

The arms 19 and 19b when extended as shown in full lines in FIG. 4 are maintained in axial alignment by a sleeve 22 slidably mounted on the arm 19 which may be shifted on the arm 19 to overlie the link 19b and its pivot 19a, and the sleeve 22 may be maintained in position by means of bolts, pins or the like so as to prevent the arms 19 and 19b from becoming out of alignment. In this manner the arms 19 and 19b and sleeve 22 will prevent the frame 16 carrying the ground wheels 18 from retracting from lowered ground-engaging position into the well 12, while the boat is being towed over a road surface. Access to the sleeve 22 may be had by opening the hinged cover 14 on the top plate 13 of the well 12. When it is desired to retract the wheels 18 into the well 12 the sleeve 22 is moved manually on the arm 19 to a position remote from the link 19b and the pivot 19c (as shown in dot-and-dash lines in FIG. 4), whereupon the frame 16 may be swung in the tube 15 into the position shown in dot-and-dash lines in FIG. 4, permitting the link 19b to pivot upon the arm 19, as clearly shown in FIG. 4.

In order to raise the frame 16 and wheels 18 into the well 12 through the opening 12a in said well, I provide a winch 22, FIG. 4, which may be hand-operated or provided with any desired means of activation, the winch coiling or uncoiling a cable 23 extending from the winch and having its free end secured to the axle 17 adjacent the center thereof.

By the above construction when the boat is lowered into the water with the ground wheel 18 lowered for ground-engagement, the ground wheels 18 can be readily raised into position within the well 12 as shown in dot-and-dash lines in FIG. 4, by the operator merely opening the hinged cover 14 in the cover plate 13 of the well 12 and after shifting the sleeve 22 into inoperative position with respect to the link 19b, manipulating the winch 22, manually or otherwise, to raise the shaft 17 from the position shown in full lines in FIG. 4 to the position shown in dot-and-dash lines in said Figure.

If desired, a sliding plate, FIG. 1, may be provided in lateral guides provided on the bottom of the boat hull, said sliding plate 24 when in operative position closing the bottom of the well 12, the same being operated by a rope 25 or the like running through eyes 26 disposed on the top of the sides of the hull and terminating adjacent the operator's seat 27, FIG. 1. When it is desired to open the slide 24 to permit the wheels 18 to be projected into road-engaging position, it is only necessary to pull the rope 25 in order to move the slide in its guides from its normal position across the opening in the boat bottom below the well 12. The rope may be maintained taut by engagement with a pin or cleat 28, as shown in FIG. 1, adjacent the operator's seat 27.

In event the boat hull is made of fiberglass or the like a modification may be used as shown in FIGS. 5 and 6. In this modification the hitch and the base for the well 12 are formed intergrally with a tow bar 30 of steel or similar tensile material. The tow bar 30 has an upturned portion 30a at its front end conforming with the bow 1a of the hull 1, which upturned portion 30a extends to substantially the top of the bow 1a. At this point the tow bar 30 has a forward extension 30b extending in advance of the bow 1a a short distance, the same being then down-turned as at 30c, the lower end of which carries the hitch plate 6 similar in all respects to that previously described in connection with FIGS. 1 and 4.

To the downward portion 30c is pivoted, as at 31, the hitch yoke 7 carrying the hitch wheel 8 as in FIGS. 1 and 4, so that the ground wheels 8 may be shifted from the position shown in FIG. 6, wherein the ground wheels may engage the ground surface to the upended position as shown in FIG. 3 by shifting the position of the bolt 10 as hereinbefore explained after the yoke 7 has been upended.

Extending laterally of the tow bar 30 at spaced intervals are cross frame member 32, FIGS. 5 and 6, to terminate adjacent the sides of the bottom of the boat hull 1, as shown; and the two bar 30 carries at its rear end a rectangular frame 33 of same size and shape as the base of the well 12 upon which rectangular frame 33 the well is adapted to be seated and connected in a watertight manner. Diagonal struts 34 are provided between the rear end of the tow bar 30 and the front corners of the frame 33 for purpose of strengthening the same. In this manner the combined tow bar, hitch and well support forms a unit which with the cross arms 33 may be formed or molded into a fibreglass hull at the time of manufacture so as to form an integral part thereof, the combination two bar, hitch and well seat frame giving the required rigidity and strength to the assembly as a whole, so that towing stresses will be imposed on the tow bar assembly and not on the fibreglass of the boat hull.

In practice it is found that the above assembly is strong and sturdy. Obviously this structure may be used for any size boat, whether for fishing or pleasure, merely by using heavier materials to support the weight. For instance, for larger boats an hydraulic lift may be installed to raise and lower the wheels 18. The unit can be installed in regular fishing boats on the market by merely cutting out a hole in the bottom to accommodate the well 12 while preventing water from entering into the boat, and by installing a hitch wheel on the boat as made by the manufacturer.

I claim:

1. A boat-trailer, comprising a boat hull having a bow and having a substantially rectangular opening extending across its bottom adjacent the stern of the hull; a built-in hitch projecting beyond the bow; a yoke horizontally pivoted on the hitch and carrying a ground-engaging wheel adapted to be pivoted to bring the wheel from lowered ground-engaging position into raised inoperative position; means for preventing pivoting of the yoke; a substantially rectangular watertight well within the hull across said opening having front and rear walls respectively; a U-shaped frame horizontally pivoted along the rear wall of the well and having parallel legs which may be swung from a position within the well to a position below the opening; a horizontal axle journaled in the said legs; rear ground wheels carried by the axle; articulated arms connecting the front wall of the well with the legs respectively; and stiffening sleeves slidable on said articulated arms adapted to be positioned over at least two adjacent articulations of the arms to maintain the rear ground wheels in lowered ground-engaging position, said sleeves when shifted to overlie only one of the articulations permitting the arms to fold and foreshorten whereby the frame, wheels and articulated arms may be raised into housed position within the well.

2. In a boat-trailer as set forth in claim 1, a plate slidable in guides on the bottom of the hull adjacent the opening therein; and means for shifting the plate to open and close the opening for said well.

3. In a boat-trailer as set forth in claim 1, winch means within the well carrying a cable having its free end connected to the said axle, whereby when the winch is actuated the frame may be raised into position within the well.

4. In a boat-trailer as set forth in claim 1, said yoke having an upper portion disposed adjacent the hitch; a socket bolt transfixing the said upper portion and hitch; and said preventing means comprising a bolt adapted to either engage registering holes in the upper portion and hitch above the socket bolt when the yoke is in lowered ground-engaging position, or to engage registering holes in the upper portion and hitch below the socket bolt when the yoke is in raised position.

5. In a boat-trailer as set forth in claim 1, said hull being formed of fiberglass; a metallic built-in tow bar in the hull bottom; said hitch being formed integrally with the tow bar; a horizontal rectangular frame formed integrally with the tow bar disposed at the rear end thereof; said frame being of same size and shape as the base of the well and forming a watertight seat therefor, whereby any towing stresses will be imposed on the tow bar assembly rather than on the fibreglass of the hull.

6. A boat-trailer, comprising a boat hull having a bow and having a substantially rectangular opening extending across its bottom adjacent the stern of the hull; a built-in hitch projecting beyond the bow; a yoke horizontally pivoted on the hitch and carrying a ground-engaging wheel whereby the yoke may be pivoted to bring the wheel from lowered ground-engaging position into raised inoperative position; means for retaining the yoke in either position; a substantially rectangular watertight well within the hull across said opening having front and rear walls respectively; a hinged cover for said well; a U-shaped frame horizontally pivoted along the lower end of the rear wall of the well whereby the legs of the frame may be swung from a position within the well to a position below the opening; a horizontal axle journaled in said legs; rear ground wheels carried by the ends of the axle; articulated arms connecting the lower end of the front wall of the well with the legs respectively; and stiffening sleeves slidable on said articulated arms adapted to be positioned over at least two adjacent articulations of the arms to maintain the rear ground wheels in lowered ground-engaging position, said sleeves when shifted to overlie only the innermost articulation permitting the arms to fold and foreshorten whereby the frame, wheels and articulated arms may be raised into housed position within the well.

7. In a boat-trailer as set forth in claim 6, a plate slidable in guides on the bottom of the hull adjacent the opening therein; and means for shifting the plate to open and close the opening for said well.

8. In a boat-trailer as set forth in claim 6, winch means within the well carrying a cable having its free end connected to the said axle, whereby when the winch is actuated the frame may be raised into position within the well.

9. In a boat-trailer as set forth in claim 6, said yoke having an upper portion disposed adjacent the hitch; a socket bolt transfixing the said upper portion and hitch; and said retaining means comprising a bolt adapted to either engage registering holes in the upper portion and hitch above the socket bolt when the yoke is in lowered ground-engaging position or to engage registering holes in the upper portion and hitch below the socket bolt when the yoke is in raised position.

10. In a boat-trailer as set forth in claim 6, said hull being formed of fiberglass; a metallic built-in tow bar in the hull bottom; said hitch being formed integrally with the tow bar; integral cross members on the tow bar at spaced intervals extending to the sides of the hull within the hull bottom; an integral horizontal rectangular frame disposed at the rear end of the tow bar; said frame being of same size and shape as the base of the well and forming a watertight seat for the well, whereby any towing stresses will be imposed on the tow bar assembly rather than on the fibreglass of the hull.

* * * * *